United States Patent [19]
Ogden et al.

[11] Patent Number: 5,769,725
[45] Date of Patent: Jun. 23, 1998

[54] INFLATABLE MOTION BASE

[75] Inventors: Andrew M. Ogden, Pasadena;
Marshall M. Monroe, La Canada;
David F. Barnett, Simi Valley, all of Calif.

[73] Assignee: Disney Enterprises, Inc., Burbank, Calif.

[21] Appl. No.: 680,908

[22] Filed: Jul. 16, 1996

[51] Int. Cl.$^6$ .................................................. A63G 31/12
[52] U.S. Cl. ............................................. 472/59; 472/134
[58] Field of Search .............................. 472/59, 60, 134; 434/55, 59

[56] References Cited

U.S. PATENT DOCUMENTS

| | | |
|---|---|---|
| 1,082,699 | 12/1913 | Maynard . |
| 3,602,499 | 8/1971 | Kojima . |
| 3,964,316 | 6/1976 | Abe . |
| 4,938,148 | 7/1990 | Driessen . |
| 5,219,315 | 6/1993 | Fuller et al. . |
| 5,282,772 | 2/1994 | Ninomiya et al. . |
| 5,433,670 | 7/1995 | Trumbull . |

*Primary Examiner*—Kien T. Nguyen
*Attorney, Agent, or Firm*—Pretty, Schroeder & Poplawski

[57] ABSTRACT

The invention regards an inflatable motion base for moving one or more loads, such as objects or riders, through various degrees of freedom, and a simulator employing the motion base. The invention includes a plurality of modular, inflatable cells on a foundation that serves as a structure to provide reaction forces, the cells being adjacent to each other and joined along their load-bearing surfaces with interlaced bungee cords. Each cell is connected to a high volume manifold through an inlet. The inlets each include an actuator controlling a butterfly valve to control the airflow into the cell. A plurality of pumps maintain the manifold pressure. Each cell is also provided with an exhaust passage, which includes an actuator controlling a butterfly valve to control the airflow out of the cell. The exhaust passages connect to tubes that direct the exhaust to blow on the cell load-bearing surfaces. The foundation houses manifolds, inlets, exhaust passages, pumps, and sound dampening material. An automated control system, including positional feedback, controls the cell inlets and exhaust passages, as well as devices to provide an active visual and audio presentation, water spray, scents, moving light beams, and induced vibrations.

25 Claims, 5 Drawing Sheets

INFLATABLE MOTION BASE

BACKGROUND OF THE INVENTION

This invention relates to motion devices and, more particularly, to an inflatable motion base for moving people or objects through various degrees of freedom. The invention further relates to a simulation device incorporating an inflatable motion base for moving people in exhilarating and/or relaxing ways.

Throughout a range of simulation devices, motion bases are used to move and support one or more people. These motion bases are designed to provide for structural integrity, efficiency, safety and accurate control of the motion. In specific applications a motion base may also be designed to provide excitement, comfort, relaxation, enjoyment, and even therapeutic benefits. Motion bases providing for superior levels of these qualities are preferable, particularly ones that have low cost, high reliability, low repair time, and that are portable and not mechanically complicated.

Within the theme park or location based entertainment industries, there is a common interest in providing visceral experiences that move a rider in interesting, often exhilarating ways. Currently there are several mechanical systems available for this use. Such systems are, however, rigid in structure and inherently expensive. These systems typically move as rigid planes or chassis about various degrees of freedom. The rider's resultant experience is one of riding a singular structure translating and rotating in space, usually in a jarring and discomforting fashion.

In the specific case of simulators, consisting of a motion base with a rigid surface, a chassis vehicle, and some media to be viewed and/or heard, the motion is generally constrained to X, Y, and Z translations of a point, and heading, pitch, and roll rotations about a pivot point. The motion base surface may be moved by hydraulic actuators, high pressure pneumatic bladders or motorized actuators. Since the motion is usually about a single point relative to the rigid surface, geometry dictates fixed relative positions and accelerations of each point on the chassis. The result is the need for expensive structural designs capable of translating the dynamic loads, and the need to compromise overall motion in order to limit extreme local accelerations found on the perimeter of the chassis. In other words, the corner seat in a traditional simulator gives a much rougher ride than the seat in the middle, and thus determines the safety limits for the simulator. Such motion bases, constrained to rigidly controlled chassis motion, thus lack direct control of local positions and accelerations, and provide motion at the expense of comfort. Furthermore, such motion bases are costly, having many parts that may break down.

The U.S. Pat. No. 5,433,670, to Trumbull, discloses a compact simulator system theater that includes a motion base moveable along three displacement axes by means of displaceable actuators. The system includes a projector and screen for displaying visual images. A system controller generates motion base command signals synchronized to an audio and video display. As with other simulators, discussed above, geometry dictates the positions and accelerations of each point on the chassis. The result is an expensive device that compromises overall motion in order to limit extreme local accelerations. It lacks direct control of local positions and accelerations, and provide motion at the expense of comfort.

The U.S. Pat. No. 3,964,316, to Abe, discloses a wave motion simulator to generate wave-like patterns of force for testing surface effect ships. The simulator comprises a flexible membrane undulated in a sine-wave configuration by a series of linkages attached to the membrane at varying locations. The linkages are reciprocatingly actuated to produce the sine-wave configuration. The mechanism is highly complicated, containing many mechanical parts. The resulting motion is limited to a large number of discrete displacements that simulate wave-like motion.

Outside of the art of motion devices, it is known that a compliant air mattress may be used to rest upon. Such air mattresses are airtight, and may include more than one sealed compartments. It is further known that a sealed air chamber and air pump may be used to support or lift a load. One example of this is a lift mechanism used for lifting heavy pallets or overturned trucks. Such devices do not allow controlled motion in other than a single degree of freedom, and provide no contour control such as would be needed for use in a motion base.

Another type of air device is a "bounce house," being a domed inflatable play room that allows children to bounce upon a floor formed by a large air mattress. In such a device, a continuously operating fan maintains the inflation of the air mattress. The inflation level of the device varies with the number of occupants in the room because the fan operates at a constant level. Such a device allows the children to jump and bounce at will, but provides no motive forces other than in response to the action of the children.

The U.S. Pat. No. 1,082,699, to Maynard, discloses an amusement apparatus having an inflatable platform made of flexible air-tight material. The platform includes tension members that produce the shape of the platform when it is inflated. The platform is mounted upon a flexible resilient S floor. An air receptacle inflates the platform, using a reducing valve to set the desired pressure. The platform carries a crater with a false bottom that rises when air is admitted. The rising false bottom lifts persons located thereon. The air is provided to the crater, from the receptacle, through a valve that an operator controls. The device provides only a single degree of freedom motive force with little control.

Accordingly, there has existed a need for a low cost motion base offering a softer, more organic motion while providing more direct control of local positions and accelerations. The needed motion base should provide for structural integrity and safety, while offering efficient, accurate control over a load (such as an object or rider). When used to support people, the motion base should additionally provide comfort, relaxation, enjoyment, and even therapeutic benefits in appropriate applications. It is preferable that the motion base be of low cost, and portable. Furthermore, the motion base should be of a reliable design that provides for quick repairs. The present invention satisfies these and other needs, and provides further related advantages.

SUMMARY OF THE INVENTION

The present invention provides an inflatable motion base to move one or more loads, such as objects or riders, with direct control of local positions and accelerations. The load may be moved through various degrees of freedom with a soft, more organic feeling motion. It provides structural integrity, efficiency, safety and accurate control, as well as comfort, relaxation, enjoyment, and even therapeutic benefits in specific applications. Because of the simplicity of the invention, embodiments may be designed with simple modular parts such that they are reliable, and are quickly repaired when they break down. They may also include parts that are lightweight and/or made from existing technology, thus providing for low cost and portability.

The invention includes a plurality of inflatable cells. A portion of each cell is flexible in at least one direction. The cells are designed to be inflated with a given fluid, such as air. The walls resist passage of the fluid to allow for inflation.

A feature of the invention is that the cells may include load-bearing surfaces that either are integral with or connected to the load-bearing surfaces of every adjacent cell to create a continuous load-bearing surface. The connection may be created by linking the cells or by covering the cells with a cover. The continuous load-bearing surface is flexible in at least one degree of freedom. An example of a one degree of freedom continuous load-bearing surface would be two rigid plates connected by a hinge. The continuous load-bearing surface preferably has many degrees of freedom, with an infinite number of degrees of freedom being particularly preferable. Examples of infinite degree of freedom continuous load-bearing surfaces include a continuous load-bearing surface made from a flexible membrane and one continuous load-bearing surface comprising a flexible loadbearing surface and flexible connectors between load-bearing surfaces.

An advantage of this feature is that, by providing a continuous load-bearing surface for support, the safety and integrity of the support structure are improved. Another advantage is that adjoining cells may be held in closer contact. The cells may thereby better interact with each other's inflation level and compliance to provide a more organic feel (as discussed above), and thus more stimulating enjoyment or greater relaxation. This is particularly effective in simulating wave-like motion. Yet another advantage of this feature is that a continuous load-bearing surface with many degrees of freedom will conform to a load's bottom shape, and adjust its conformed shape in response to the load's rolling around thereon. This advantage substantially adds to the smooth, organic feel of the motion base.

A variation of this first feature of the invention is that, rather than connecting to other cells, each cell may be close enough to one or more other cells so as to provide support for a load that is also supported by the one or more other cells. Each cell may separately conform to, and apply forces to, the load, effectively simulating a continuous surface with flexibility in one or more degrees of freedom.

Another feature of the invention is that each cell is provided with an inlet for receiving fluid into the cell, and an inlet flow control device that controls the fluid flow through the inlet. In one embodiment thereof, the inlet connects the cell to a source of pressurized fluid, and the flow control device may be a valve. The valve controllably limits the flow from the pressurized source into the cell. In another embodiment, the flow control device may be a controlled fluid pump that pumps fluid into the cell through the inlet at controllably varied levels.

By controlling each flow control device, the inflation level of each cell may be independently controlled. The internal pressure of each cell is responsive to the cell inflation level, the cell inflation rate, fluid pressure at the inlet, and the load's weight resting on the cell. The inflation level and internal pressure of each cell in turn control the cell's compliance. Varying the compliance of one or more cells moves a load resting upon the cells. If a compressible fluid such as air is used to inflate the cells, the cell compliancy is enhanced, allowing for a smoother and more natural feeling motivation force.

By varying the inflation levels of different cells, there is direct control of local positions and accelerations in various degrees of freedom. Thus, it is an advantage of this feature that one or more loads can be independently and locally controlled with never before experienced accuracy. This accuracy results in a capability to offer complex motion base topologies that allow a whole new venue for visceral experiences. Embodiments of the motion base may thus be designed for relaxation and therapeutic benefits (e.g.: a bed simulating wave motions), for recreation (e.g.: creating the illusion of transportation such as on a simulated raft ride on a river), or for more general conveyance uses (e.g.: moving a heavy object from one location to another).

Another advantage of this feature is that the cells are simple devices that are not subject to the cost and reliability problems that could plague more complicated systems. Embodiments of the invention may comprise cells that are identical in design, and thus the cells may be modular, providing for quick replacement of parts. The cells are of a high volume low pressure design, reducing both the cost of production and repair. The low pressure requirements, i.e., a pressure only a moderate amount above atmospheric pressure, allow the motion base to operate from, for example, simple air blower technology rather than dangerous and costly high pressure sources. With a modular design of simple parts, the motion base may thus be designed to be portable.

This high volume system allows an even distribution of energy, reducing impact forces between the load and the cells and the potential damage therefrom. Furthermore, because embodiments of the system can use simple air blower technology operating at pressures lower than previously considered, the source(s) of inflation power may safely be kept and used close to the system. This is particularly important with compressible fluids, where greater volumes of ducting between a compressor and a cell may lead to a less responsive system.

Another feature of the invention is that each of the cells may be directly connected to a reaction structure, which is preferably rigid. The reaction structure receives forces from the cells, the forces reacting, at least in part, the motivating forces applied by the cells to the load. The portion of the cell's reaction forces that are applied to the reaction structure do not act on or through any other cell. This feature provides the advantage of accurate control. The reaction structure thus provides direct reaction forces for the motivating forces that the cells provide to a load.

These reaction forces provide for a degree of independence in the cell motivating forces, allowing for more localized control. Such independence would not be had if one cell's forces were reacted entirely through another cell. The motivating forces will not, however, be totally independent if cells are adjacent to each other (as discussed below), or if a common, non-rigid foundation is chosen. In such a case, the independence and interactivity of the cell forces may be controlled by adjusting the rigidity of the foundation and/or adjacent sides, as well as the amount of contact between the adjacent cells.

Preferably, nearby cells have flexible sides, are adjacent to each other (i.e. in side to side contact), and thus will tend to inflate into each other. This interaction, along with the deformability of the cells, provides for an interactive effect between the motivating forces that the cells impart on the load. This interactive effect provides a smoother movement of the load, while achieving a soft, compliant, "organic" feeling motion heretofore unachievable. The compliant cells provide a comfortable and safe support. Thus, the invention provides safe structural support, efficiency, comfort, and accurate control.

Another feature of the invention is that the cells may be provided with an exhaust passage that is spaced from the inlet, for exhausting fluid from the cell, and an exhaust flow control device that controls the fluid flow out of the cell. An advantage of this feature is that it allows for cell inflations and deflations that are both faster and more controlled, while requiring less pump capacity than would otherwise be needed. Thus, more enjoyment, relaxation, or utility is possible from a system of a given pump capacity. Furthermore, if the fluid is air, the exhaust air may be directed to blow on the load-bearing surfaces of the cells. An advantage of this is that the exhaust air simulates wind or motion, improving the enjoyment and/or relaxation effects of the device.

Another feature of the invention is that it may include an automated control system controlling the inlet flow control device of each cell. The control system may include pre-programmed "performances" of the motion base system, system feedback, and/or interactive input from a person using or observing the motion base. An advantage of this feature is that a given "performance" of the motion base, being a series of controlled increases and decreases of various cell inflation levels, may be repeatedly carried out without requiring a skilled operator to manually control every motion of the motion base. Furthermore, a control system can better simulate complicated or repetitive programs such as a complex river topography or a long series of gentle waves.

Another advantage of this feature is that a control system could have more precise control based on feedback from the motion base, and could be more entertaining by allowing interactive input into the performance. Yet another advantage is that the control system could also coordinate sensory effect producers such as an active visual display, audio equipment, water sprayers, scent generators, and tactile vibration inducers, as are discussed below. Such a control system allows high quality performances, maximizing the effectiveness of the motion base in moving a load, and increasing the relaxation, enjoyment and/or utility received from the motion base.

Another feature of the invention is that the motion base may further include a manifold that provides pressurized fluid to more than one the inlet, and each inlet flow control device may be a valve (as mentioned with respect to the first embodiment of the first described feature above). A plurality of pumps may pressurize the manifold. An advantage of this feature is that the pumps may also be of modular design, allowing for a quick interchange of defective parts. The motion base may be designed with adequate pump capacity to operate with one or more pumps not functioning, adding to the system reliability. Furthermore, when the fluid used is air, the fluid pumps may be lightweight, off-the-shelf high cubic-feet per minute (CFM) blowers, decreasing the overall cost of the system and increasing portability.

Another feature of the invention is that the foundation may contain the aforementioned pumps and manifolds, and additionally contains material positioned to dampen noise produced by the pumps. An advantage of this feature is that the invention operates with less noise, the sound being dampened by the manifolds, cells and dampening material. The quieter operation enhances the relaxation and enjoyment aspects of the invention when the load is a person.

Another feature of the invention is that the invention may include an active visual display, audio equipment, water sprayers, scent generators, and tactile vibration inducers. Active visual displays include the display or projection of recorded images, flashing, moving or turning lights, visible moving objects, and other time variant visual images. Audio equipment may include devices producing recorded, simulated, and physically created sounds. These effects provide entertaining or relaxing stimulation, and may be coordinated with the inflatable motion base motions. An advantage of this feature is that such stimulation enhances enjoyment and relaxation.

Other features and advantages of the invention will become apparent from the following detailed description, taken in conjunction with the accompanying drawings, which illustrate, by way of example, the principles of the invention.

DETAILED DESCRIPTION OF THE PREFERRED EMBODIMENT

Figure 1:
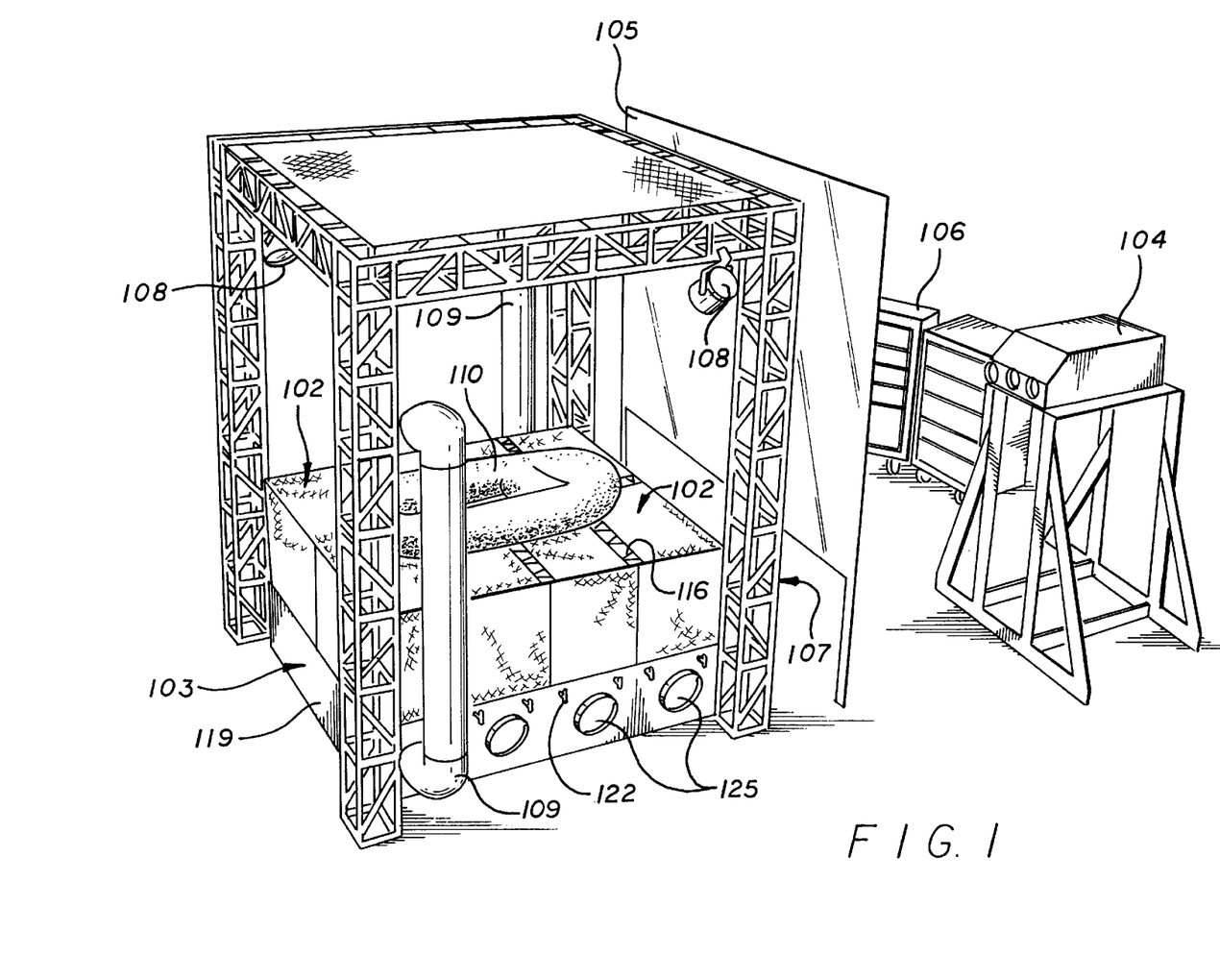
FIG. 1 is a perspective view of a motion base, embodying features of the present invention, adapted for use as a river rafting simulator.
Figure 2:
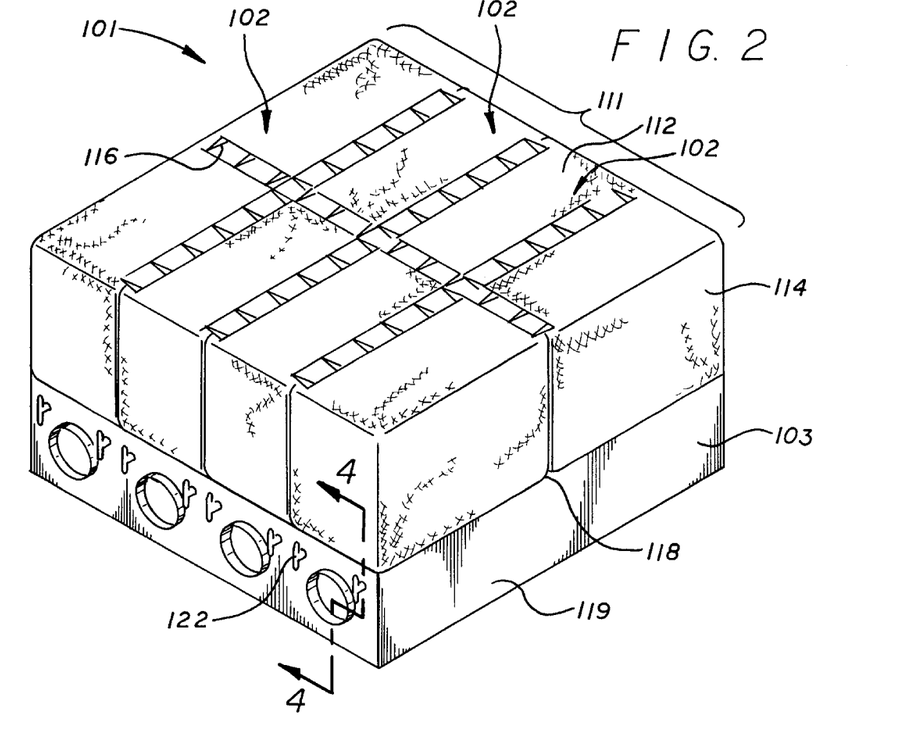
FIG. 2 is a perspective view of the motion base depicted in FIG. 1 without the river rafting adaptations.

An inflatable motion base 101 according to the present invention, as adapted for use as a river rafting simulator, is shown in FIGS. 1 & 2. The motion base includes a plurality of inflatable cells 102, which is mounted on a foundation 103. The cells are preferably designed to inflate with a compressible fluid, air being the particularly preferred fluid. The foundation serves as a reaction structure that the cells are independently connected to. It will be understood by one skilled in the art that the cells could be affixed to the ground, the ground thus serving as the foundation. The simulator further includes a video source 104, a rear projection screen 105, an audio source 106, a truss 107, lights 108, exhaust tubes 109, water sprayers 210, scent generators 220, a tactile vibration inducer 230, and a raft 110.

Figure 3:
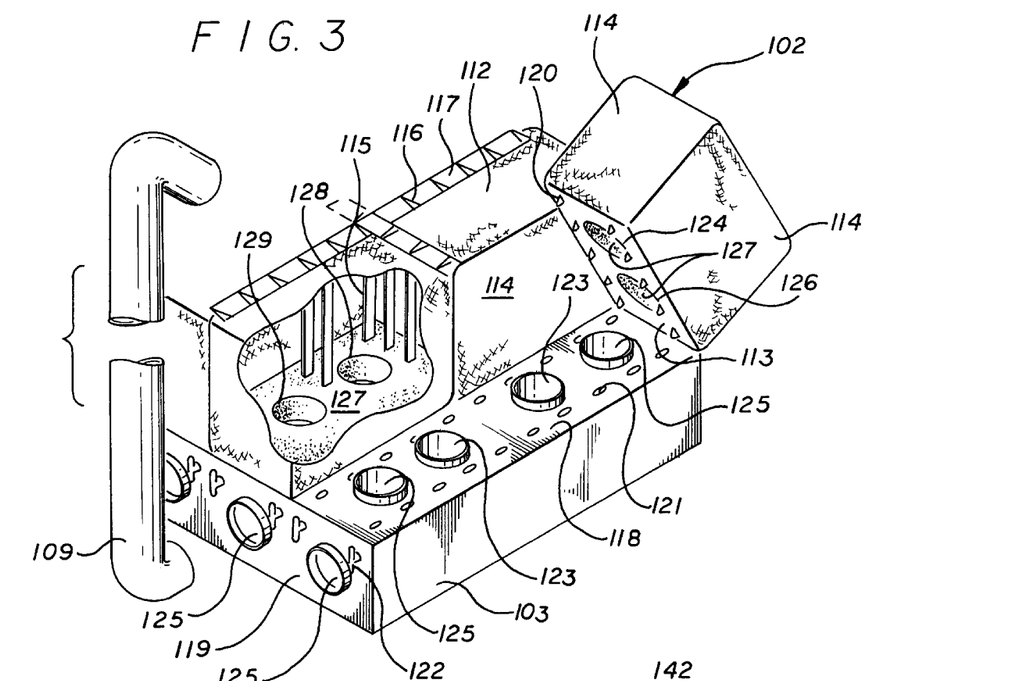
FIG. 3 is an exploded perspective view of the motion base depicted in FIG. 2.

With reference to FIGS. 1–3, each cell 102 is preferably mounted on and affixed to the foundation 103. Each cell is close enough to other cells as to provide support for a load that is also supported by nearby cells. Preferably, each cell is adjacent (in side to side contact with) other cells. The inflated cells may be any shape or shapes, but are preferably of the same shape and modular. Preferably the cells of the invention are plane filling in plan view (i.e., rectangular, triangular, hexagonal, or the like, and fitting together like puzzle pieces to make a solid surface when viewed from above) so that the cells may be connected to create a single, multi-chambered volume. In the preferred embodiment, the cells are rectangular, and create a single box-like structure 111 with a flexible, continuous load-bearing surface supported by chambered volumes.

The rectangular preferred embodiment of a cell is constructed from flexible walls including a load-bearing surface 112, a lower wall 113 and side walls 114. The wall flexibility may include stretching in all directions, or may be defined by flexible attachment of rigid sections. Preferably, the wall flexibility includes bending in all directions. When the cell is inflated, the rectangular shape is maintained through the use of internal buttress straps 115. The walls preferably are relatively airtight, and may be made from heavy weight nylon fabric backed by a heat sealable urethane coating.

The cells 102 may be connected to form the continuous load-bearing surface, and are preferably connected with a flexible lacing 116, such as one or more bungee cords interlaced between loops 117 on the cells. The connection is preferably located between the load-bearing surfaces 112 of adjacent cells. When adjacent cells inflate, their adjacent side walls 114 bulge outward and press against each other, affecting the cells' inflation levels and internal pressures. Another possible method of connecting the cells to create a continuous load-bearing surface employs cells using a flexible, integral load-bearing surface throughout the motion base, wherein the lower and side walls all affix to the common load-bearing surface. Yet another possible method involves containing the cells within or below a flexible cover that stretches over the load-bearing surfaces of the cells. The flexibility of the continuous load-bearing surface or cover should be in at least one direction along one axis, and is preferably in all directions at all locations.

The foundation 103 may include a rigid outer frame having a foundation top 118 and foundation sides 119. The foundation and cells may have mating connectors to affix the cells to the foundation. The cells 102 are preferably affixed on the foundation by protruding U-bolts 120 on the cell lower walls 113, the U-bolts being received in conforming cell-grip holes 121 in the foundation top. The cells may be further affixed on the foundation by hooks (described below) that may be interlocked with the U-bolts by turning handles 122.

Each cell 102 cooperates with an inlet 123, which is preferably protruding from the foundation top 118, for receiving air into the cell. The inlet is conformingly received into an inlet hole 124 in the lower wall 113 of the cell. Passage of air through the inlets may be controlled through any known device, selectively allowing the passage of air to inflate the cells. The passage of air into different cells may be independently controlled. Thus, each cell may be partially or totally inflated independently of the other cells by passing air through only the inlet that is associated with that cell.

Each cell 102 may also cooperate with a controlled exhaust passage 125 that is preferably protruding from the foundation top 118. The exhaust passage is conformingly received into an exhaust passage hole 126 of the cell, and exhausts air from the cell. The exhaust passages may be controlled through any known device, selectively allowing the passage of air to deflate the cell. The cell deflates both under the weight of the load and the weight of its own material. The cells may include elastic walls or surfaces, or elastic buttress straps to further encourage deflation. The exhaust passage flow control devices may be controlled independently from one another. For each cell, the exhaust passage control device is preferably controlled in coordination with the inlet control device to adjust the cell inflation level quickly and accurately. Thus, each cell may be partially or totally deflated independently of the other cells by restricting the passage of air through the inlet and allowing unimpeded flow through the exhaust.

Each cell 102 preferably contains a layer of padding 127, which may be affixed to the cell lower wall 113. The padding includes holes 128 & 129 that conformingly receive the inlet 123 and exhaust passage 125. The padding serves to protect a load that rests upon a totally deflated cell. Of particular import, the padding helps to prevent a load from resting on the inlet and exhaust passage and potentially causing damage thereby. Thus, the padding is preferably thick enough to support a load above the inlet and exhaust passage. The padding also serves to maintain an airtight connection between the cell and its inlet and exhaust passage.

The exhaust passage 125 preferably directs the exhaust gas out of the foundation 103 and into conforming exhaust tubes 109, which in turn direct the exhaust gas to blow down onto and across the load-bearing surfaces 112 of the cells 102. The exhaust gas may thereby blow on users of the motion base, creating a wind effect and making the ride either more exhilarating or more relaxing (depending on the amount of wind).

Figure 4:
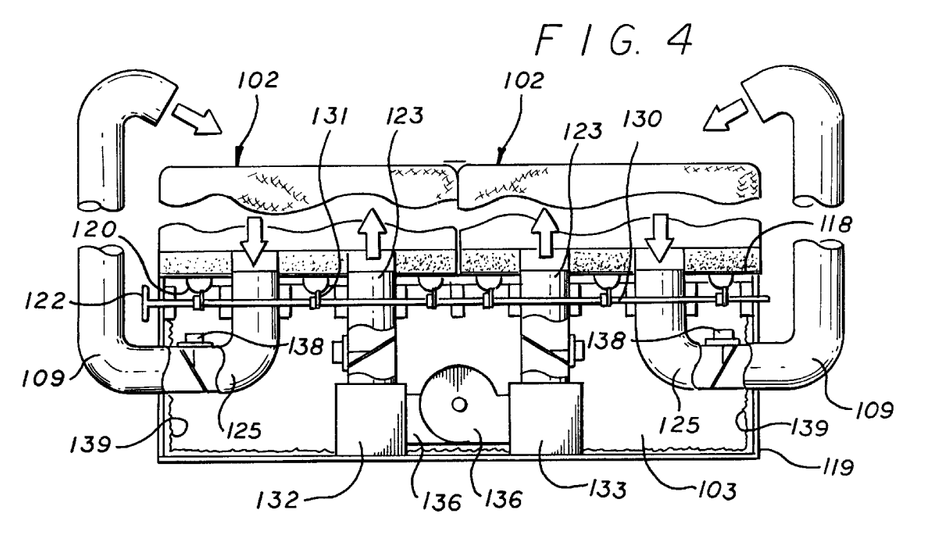
FIG. 4 is a cross-sectional, elevational view of the motion base depicted in FIG. 2, taken along line 4—4 of FIG. 2.

With reference to FIGS. 3 & 4, the foundation 103 preferably contains lock-down rods 130 having hooks 131. The lock-down rods may be made to rotate through the use of handles 122, the rotation causing the hooks to interlock with the U-bolts 120, which protrude down through the foundation top 118. The hooks and U-bolts thus form mating connectors to affix the cells to the foundation.

Figure 5:
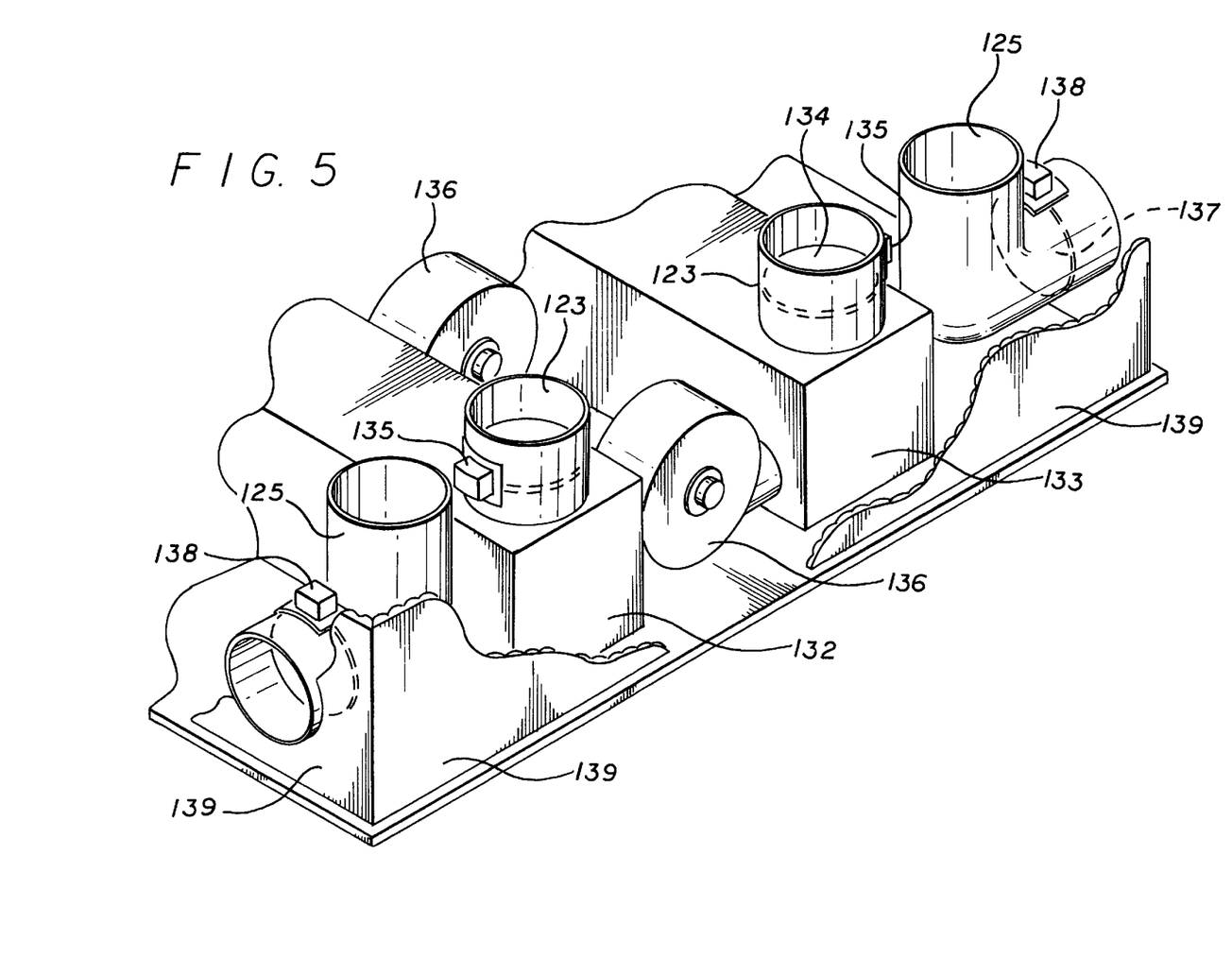
FIG. 5 is a perspective view of the interior of a foundation, as would be found in the motion base depicted in FIG. 1, with the top, sides, and structural support members removed for illustration purposes.

Referring now to FIGS. 4 & 5, note that FIG. 5 depicts the interior of the foundation 103 with the foundation top 118, the foundation sides 119, and structural support members inside the foundation removed for illustration purposes. Within the foundation, the inlets 123 preferably connect the cells 102 to one of two manifolds 132 & 133. Each manifold provides large volumes of air at above atmospheric pressure to four inlets. The inlets preferably use large orifice butterfly valves 134 controlled by actuators 135 as inlet control devices. Air is allowed to pass from a manifold into a cell when the actuator actuates the appropriate inlet butterfly valve into an open position.

The manifolds 132 & 133 preferably receive air from eight centrifugal high CFM blowers 136, four blowers being connected to each manifold. The blowers are alternately interspaced between the manifolds such that one blower is by each inlet 123. The manifolds, which surround the blowers on two sides, are preferably made of a material that dampens sound, such as wood, so as to suppress sound emanating from the blowers.

The blowers provide air for the cells at pressures on an order of magnitude of 1.5 psi over atmospheric pressure. Large volumes of air are provided at roughly this pressure level.

Each exhaust passage 125 connects one cell 102 to the exhaust tubes 109. Each exhaust passage preferably includes a large orifice butterfly valve 137 controlled by an actuator 138. Air is allowed to pass from a cell to its exhaust passage when the actuator actuates the exhaust passage's butterfly valve into an open position.

Structural support members (not shown), which support the contents of the foundation 103, are preferably positioned around the blowers 136 and manifolds 132 & 133. The support members are preferably made of a material that dampens sound, such as wood, so as to suppress sound emanating from the foundation. Additional sound dampening materials 139, such as an anechoic foam or other open-celled sound-absorbing foam, are placed within the foundation to further suppress unwanted noise. Several different types of sound dampening material may be used to meet different dampening needs. The cells 102, which are positioned above the blowers and manifolds, also serve to dampen unwanted noise.

Figure 7:
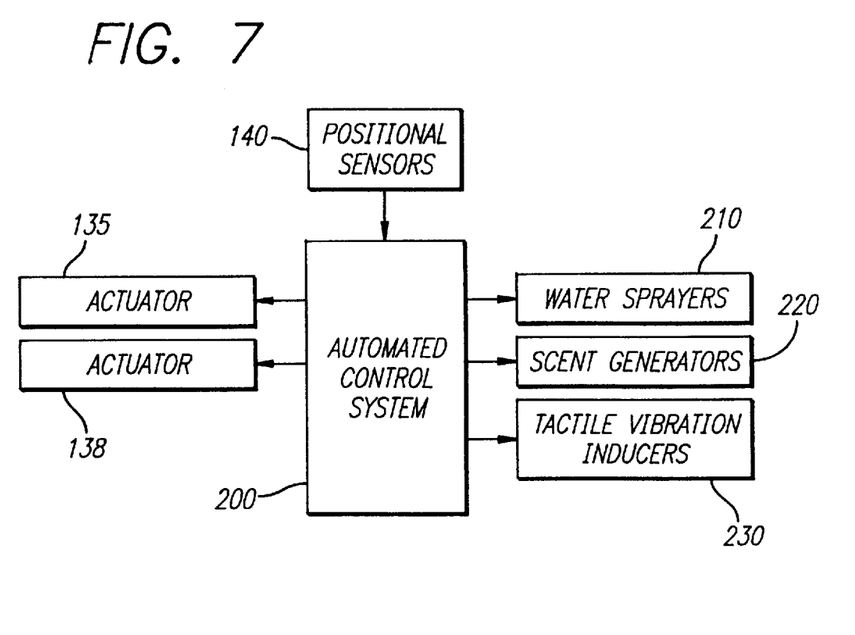
FIG. 7,is a block diagram of an automated control system and various devices under its control according to one embodiment of the present invention.

An automated control system 200, such as a digital control system, preferably controls the actuation of the actuators 135 & 138. The control system thus can run the motion base cells through a pre-programmed series of inflation levels, forming a "performance." The control system also may control the visual and audible effects to provide a more complete simulation experience. Other sensory input devices, such as water sprayers, scent generators, moving lights, vibration inducers, and the like, may also be included with the motion base and may likewise be controlled by the control system.

The control system may be augmented with interactive user input. Such input could consist of the position of an oar (in a boat or raft ride), the movement of a yoke (in an aircraft simulation), or even the position and orientation of a users head. Likewise, a control system could include feedback from the motion base system which is input into the control system. Preferably, the feedback is based on the load-bearing surface positional response of the cells to the varied inflation levels. The user input or feedback could be sensed by appropriately placed positional sensors on an oar, yoke, user helmet, or cell load-bearing surface. One positional sensor appropriate to this type of application is the FLOCK-OF-BIRDS (TM) tracker by ASCENSION TECHNOLOGY CORPORATION.

Figure 6:
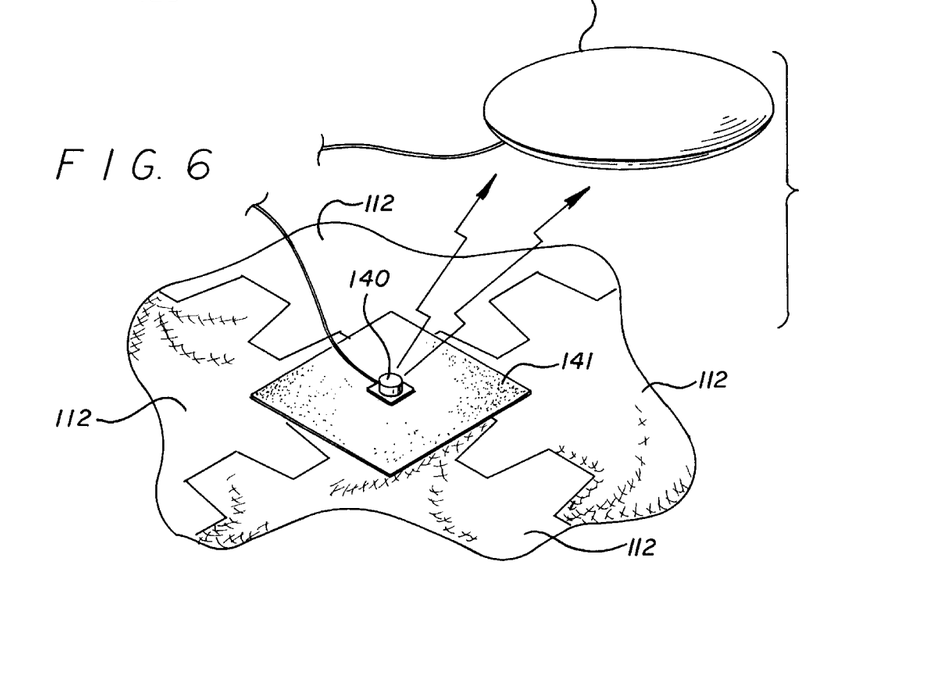
FIG. 6 is a perspective view of a portion of a motion base including a sensing device.

Referring now to FIG. 6, a positional sensor 140, mounted on a substrate 141, is positioned on the junction of four cell load-bearing surfaces 112. The sensor senses motion in six degrees of freedom, being three axes displacement along with pitch, roll and yaw rotation. The sensing mechanism includes a receiver 142 located discretely nearby.

The inflatable motion base may be enjoyed as a recreational device by locating people on the load-bearing surface, and inflating and deflating the cells so as to toss the people about in an exciting and unpredictable way. Motions, such as those experienced by a raft going down a river, may be simulated as such. Thus, a river rafting simulator is formed by placing a raft on the cell loadbearing surfaces. Other vehicles may likewise be simulated, such as cars, boats aircraft, spacecraft, and the like. It is noteworthy that even for rigid vehicles there is a more organic feel to the motion, in that the vehicles are allowed to freely move and roll rather than being rigidly attached to a motion base.

The inflatable motion base may serve as a relaxation device by locating people on the load-bearing surface, and inflating and deflating the cells so as to gently roll or move the people about in a soothing manner. Motions such as those experienced by a raft on gentle waves serve to produce this effect.

The inflatable motion base may serve as a conveyor device by placing a length of cells in a row and creating wave like motions flowing along the row. An object placed at one end of the row may be slid or rolled along the row of cells by the wave-like motion.

From the foregoing, it will be appreciated that the present invention provides structural integrity, efficiency, safety and accurate control, as well as comfort, relaxation, enjoyment, and even therapeutic benefits in specific applications. Furthermore, embodiments may be designed in modular forms that are both reliable and quickly repaired. Such embodiments may be designed to be economical and portable.

While a particular form of the invention has been illustrated and described, it will be apparent that various modifications can be made without departing from the spirit and scope of the invention. For example, controlled inlets that connect between cells rather than to an outside pressure source are within the scope of the invention. Such inlets would create dependent pairs of cells, pumping the fluid from one cell to the other. The dependent cell pairs are independent from other dependent cells pairs. Thus, although the invention has been described in detail with reference only to the preferred embodiments, those having ordinary skill in the art will appreciate that various modifications can be made without departing from the invention. Accordingly, the invention is not intended to be limited, and is defined with reference to the following claims.

I claim:

1. An inflatable motion base for use with a fluid to move a load through various degrees of freedom, comprising:
    a plurality of inflatable cells, each of said cells provided with an inlet for receiving fluid into said cell and a flow control device that controls the fluid flow passing through said inlet, wherein at least one of said cells includes a load-bearing surface connecting to the load-bearing surface of another cell to create a continuous load-bearing surface that is flexible in at least one degree of freedom; and
    a reaction structure, wherein each cell is directly connected to said reaction structure.

2. The inflatable motion base of claim 1, wherein at least one of said load-bearing surfaces is a flexible membrane.

3. The inflatable motion base of claim 1, wherein the continuous load-bearing surface is integral.

4. The inflatable motion base of claim 1, wherein flexible connectors are employed to form the continuous load-bearing surface.

5. The inflatable motion base of claim 1, further comprising a continuous cover wherein each of said cells includes a load-bearing surface that is covered by the continuous cover to form the continuous load-bearing surface.

6. The inflatable motion base of claim 1, wherein said cells are modular.

7. The inflatable motion base of claim 1, wherein each cell contains a layer of padding.

8. An inflatable motion base for use with a fluid to move a load through various degrees of freedom, comprising:
    a plurality of inflatable cells, each of said cells being provided with an inlet for receiving fluid into said cell and a flow control device that controls the fluid flow passing through said inlet, wherein at least one of said cells includes a load-bearing surface connecting to the load-bearing surface of another cell to create a continuous load-bearing surface that is flexible in at least one degree of freedom; and
    an automated control system, wherein said automated control system controls said flow control devices.

9. The inflatable motion base of claim 8, wherein each of said inlets connects said cell to a source of pressurized fluid, and said flow control devices are valves that controllably limit the flow from the pressurized source to said cells.

10. The inflatable motion base of claim 8, further comprising a manifold that provides pressurized fluid to more than one inlet, wherein said manifold is pressurized by a plurality of fluid pumps.

11. The inflatable motion base of claim 10, wherein said fluid pumps are air pumps.

12. The inflatable motion base of claim 8, further comprising a reaction structure, wherein each of said cells is directly connected to said reaction structure.

13. The inflatable motion base of claim 12, wherein said reaction structure is a foundation containing said fluid pumps, and further containing materials positioned to dampen noise produced by said fluid pumps, said cells having connectors affixing said cells to said reaction structure.

14. The inflatable motion base of claim 8, further comprising one or more sensory effect producers selected from the group of an active visual display, audio equipment, a water sprayer, a scent generator, and a tactile vibration inducer.

15. The inflatable motion base of claim 8, further including a sensor, wherein the sensor provides input to the automated control system.

16. An inflatable motion base for use with a fluid to move a load through various degrees of freedom, comprising:

a plurality of inflatable cells, each of said cells being provided with an inlet for receiving fluid into said cell, an exhaust passage spaced from said inlet for exhausting fluid from said cell and an exhaust flow control device that controls the fluid flow passing through said exhaust passage, wherein at least one of said cells includes a load-bearing surface connecting to the load-bearing surface of another cell to create a continuous load-bearing surface that is flexible in at least one degree of freedom.

17. The inflatable motion base of claim 16, wherein said exhaust flow control devices are valves.

18. The inflatable motion base of claim 16, further comprising an automated control system, wherein said automated control system controls said exhaust flow control device.

19. The inflatable motion base of claim 18, further comprising a reaction structure, wherein each of said cells is directly connected to said reaction structure.

20. The inflatable motion base of claim 18, each of said cells further having an inlet flow control device that controls the fluid flow passing through said inlet, wherein said automated control system controls said inlet flow control device.

21. The inflatable motion base of claim 16, further comprising a reaction structure, wherein each of said cells is directly connected to said reaction structure.

22. An inflatable motion base to move a load through various degrees of freedom, comprising:

a plurality of modular inflatable cells having load-bearing surfaces and a layer of padding, wherein at least a portion of each of said cells is a flexible membrane, each of said cells is in contact with at least one other cell, and one or more flexible connectors connect each cell load-bearing surface to the load-bearing surface of another cell to create a continuous, flexible surface;

each of said cells being provided with an inlet for receiving air into said cell from a manifold, and a valve that controls the air flow passing from said manifold to said cell through said inlet, wherein said manifold provides air to more than one inlet, and is pressurized by a plurality of air pumps;

each of said cells being provided with an exhaust passage spaced from said inlet for exhausting air from said cell, and an exhaust valve that controls the air flow passing through said exhaust passage;

a foundation containing said air pumps and materials positioned to dampen noise produced by said air pumps, wherein each of said cells is directly connected to said foundation, said cells having connectors affixing said cells to said foundation;

an automated control system, wherein said automated control system controls said valves and receives input from a sensor; and one or more sensory effect producers selected from the group of an active visual display, audio equipment, a water sprayer, a scent generator, and a tactile vibration inducer.

23. A method for moving a load through various degrees of freedom, comprising:

positioning the load on an inflatable motion base for use with a fluid, said motion base including a plurality of inflatable cells, each of said cells being provided with an inlet for receiving fluid into said cell and a flow control device that controls the fluid flow passing through said inlet, wherein at least one cell includes a load-bearing surface connecting to the load-bearing surface of another cell to create a continuous load-bearing surface that is flexible in at least one degree of freedom, and a reaction structure, wherein each of said cells is directly connected to said reaction structure; and selectively inflating and deflating the cells of the motion base to move the load.

24. The method for moving a load of claim 23, further comprising an automated control system controlling said flow control devices.

25. The method for moving a load of claim 23, further comprising an exhaust passage spaced from said inlet for exhausting fluid from said cell, and an exhaust flow control device that controls the fluid flow passing through said exhaust passage.

* * * * *